(12) United States Patent
Wampler

(10) Patent No.: US 7,088,352 B2
(45) Date of Patent: Aug. 8, 2006

(54) DYNAMIC DEVICE AND METHOD FOR DISPENSING MACHINES

(75) Inventor: Scott D. Wampler, West Chester, OH (US)

(73) Assignee: NOVUS Partners LLC, Cincinnati, OH (US)

( * ) Notice: Subject to any disclaimer, the term of this patent is extended or adjusted under 35 U.S.C. 154(b) by 325 days.

(21) Appl. No.: 10/412,539

(22) Filed: Apr. 11, 2003

(65) Prior Publication Data

US 2003/0234777 A1    Dec. 25, 2003

Related U.S. Application Data

(63) Continuation-in-part of application No. 10/175,057, filed on Jun. 19, 2002.

(51) Int. Cl.
*G09G 5/00* (2006.01)

(52) U.S. Cl. .................................... 345/204; 345/107
(58) Field of Classification Search ............. 345/204, 345/84, 107

See application file for complete search history.

(56) References Cited

U.S. PATENT DOCUMENTS

| | | | |
|---|---|---|---|
| 3,373,517 A | 3/1968 | Halperin |
| 3,376,465 A | 4/1968 | Corpew |
| 3,848,193 A | 11/1974 | Martin |
| 3,941,926 A | 3/1976 | Slobodzian |
| 3,983,317 A | 9/1976 | Glorioso |
| 3,993,955 A | 11/1976 | Belcher |
| 4,094,010 A | 6/1978 | Pepper |
| 4,126,854 A | 11/1978 | Sheridon |
| 4,155,042 A | 5/1979 | Permut |
| 4,332,022 A | 5/1982 | Ceshkovsky |
| 4,368,485 A | 1/1983 | Midland |
| 4,476,488 A | 10/1984 | Merrell |
| 4,536,791 A | 8/1985 | Campbell |
| 4,559,480 A | 12/1985 | Nobs |
| 4,575,750 A | 3/1986 | Callahan |

(Continued)

FOREIGN PATENT DOCUMENTS

CA    2064855    3/1991

(Continued)

OTHER PUBLICATIONS

International Search Report, dated Oct. 26, 2000 for PCT Application No. PCT/US00/11022.

(Continued)

*Primary Examiner*—Bipin Shalwala
*Assistant Examiner*—Steven Holton
(74) *Attorney, Agent, or Firm*—Forest Brown Todd LLC

(57) ABSTRACT

The present invention relates, in general, to dispensing machines and methods and, more particularly, to dispensing machines capable of dynamic-content presentation and methods of using dispensing machines capable of dynamic-content presentation. The dispensing machine includes a content display unit that communicates with a display controller, visually displaying dynamic-content. The controller may comprise a timing means, altering the visual display as a function of the timing means. The display controller adapted to receive, store, and display dynamic-content from a plurality of servers, comprising a hierarchical control scheme to select dynamic-content from one server of the plurality of servers for display. The device may comprise a plurality of display controllers, each display controller having a type identifier, wherein each selects dynamic-content for display on its content display unit as a function of the type identifier.

35 Claims, 7 Drawing Sheets

U.S. PATENT DOCUMENTS

| | | |
|---|---|---|
| 4,595,950 A | 6/1986 | Lofberg |
| 4,654,482 A | 3/1987 | DeAngelis |
| 4,716,410 A | 12/1987 | Nozaki |
| 4,734,779 A | 3/1988 | Levis |
| 4,734,858 A | 3/1988 | Schlafly |
| 4,761,641 A | 8/1988 | Schreiber |
| 4,797,913 A | 1/1989 | Kaplan |
| 4,812,843 A | 3/1989 | Champion, III |
| 4,829,569 A | 5/1989 | Seth-Smith |
| 4,847,825 A | 7/1989 | Levine |
| 4,862,268 A | 8/1989 | Campbell |
| 4,908,713 A | 3/1990 | Levine |
| 4,949,187 A | 8/1990 | Cohen |
| 5,046,090 A | 9/1991 | Walker |
| 5,051,822 A | 9/1991 | Rhoades |
| 5,073,925 A | 12/1991 | Nagata |
| 5,107,107 A | 4/1992 | Osborne |
| 5,121,430 A | 6/1992 | Ganzer |
| 5,123,046 A | 6/1992 | Levine |
| 5,133,079 A | 7/1992 | Ballantyne |
| 5,182,669 A | 1/1993 | Chikuma |
| 5,191,573 A | 3/1993 | Hair |
| 5,214,793 A | 5/1993 | Conway |
| 5,233,423 A | 8/1993 | Jernigan |
| 5,235,587 A | 8/1993 | Bearden |
| 5,251,193 A | 10/1993 | Nelson |
| 5,257,017 A | 10/1993 | Jones |
| 5,260,778 A | 11/1993 | Kauffman |
| 5,274,762 A | 12/1993 | Peterson |
| 5,283,731 A | 2/1994 | Lalonde |
| 5,297,204 A | 3/1994 | Levine |
| 5,311,423 A | 5/1994 | Clark |
| 5,319,735 A | 6/1994 | Preuss |
| 5,355,302 A | 10/1994 | Martin |
| 5,365,282 A | 11/1994 | Levine |
| 5,373,330 A | 12/1994 | Levine |
| 5,389,945 A | 2/1995 | Sheridon |
| 5,392,066 A | 2/1995 | Fisher |
| 5,414,756 A | 5/1995 | Levine |
| 5,418,713 A | 5/1995 | Allen |
| 5,420,647 A | 5/1995 | Levine |
| 5,420,923 A | 5/1995 | Beyers, II |
| 5,428,606 A | 6/1995 | Moskowitz |
| 5,465,291 A | 11/1995 | Barrus |
| 5,469,020 A | 11/1995 | Herrick |
| 5,473,584 A | 12/1995 | Oshima |
| 5,486,819 A | 1/1996 | Horie |
| 5,495,283 A | 2/1996 | Cowe |
| 5,497,186 A | 3/1996 | Kawasaki |
| 5,497,479 A | 3/1996 | Hornbuckle |
| 5,508,815 A | 4/1996 | Levine |
| 5,512,935 A | 4/1996 | Majeti |
| 5,513,260 A | 4/1996 | Ryan |
| 5,530,751 A | 6/1996 | Morris |
| 5,532,920 A | 7/1996 | Hartrick |
| 5,543,856 A | 8/1996 | Rosser |
| 5,557,541 A | 9/1996 | Schulhof |
| 5,559,549 A | 9/1996 | Hendricks |
| 5,565,909 A | 10/1996 | Thibadeau |
| 5,568,272 A | 10/1996 | Levine |
| 5,592,511 A | 1/1997 | Schoen |
| 5,592,551 A | 1/1997 | Lett |
| 5,592,626 A | 1/1997 | Papadimitriou |
| 5,600,839 A | 2/1997 | MacDonald |
| 5,604,027 A | 2/1997 | Sheridon |
| 5,612,741 A | 3/1997 | Loban et al. |
| 5,619,247 A | 4/1997 | Russo |
| 5,621,863 A | 4/1997 | Boulet |
| 5,627,895 A | 5/1997 | Owaki |
| 5,628,050 A | 5/1997 | McGraw |
| 5,630,067 A | 5/1997 | Kindell |
| 5,638,113 A | 6/1997 | Lappington |
| 5,640,453 A | 6/1997 | Schuchman |
| 5,644,859 A | 7/1997 | Hsu |
| 5,646,603 A | 7/1997 | Nagata |
| 5,646,997 A | 7/1997 | Barton |
| 5,654,747 A | 8/1997 | Ottesen |
| 5,659,366 A | 8/1997 | Kerman |
| 5,659,613 A | 8/1997 | Copeland |
| 5,661,516 A | 8/1997 | Carles |
| 5,664,018 A | 9/1997 | Leighton |
| 5,675,734 A | 10/1997 | Hair |
| 5,684,918 A | 11/1997 | Abecassis |
| 5,689,799 A | 11/1997 | Dougherty |
| 5,692,214 A | 11/1997 | Levine |
| 5,701,161 A | 12/1997 | Williams |
| 5,701,383 A | 12/1997 | Russo |
| 5,701,397 A | 12/1997 | Steimle |
| 5,710,869 A | 1/1998 | Godefray |
| 5,717,814 A | 2/1998 | Abecassis |
| 5,717,832 A | 2/1998 | Steimle |
| 5,721,827 A | 2/1998 | Logan |
| 5,721,951 A | 2/1998 | DorEl |
| 5,724,062 A | 3/1998 | Hunter |
| 5,724,064 A | 3/1998 | Stefik |
| 5,724,091 A | 3/1998 | Freeman |
| 5,724,525 A | 3/1998 | Beyers, II |
| 5,729,214 A | 3/1998 | Moore |
| 5,734,413 A | 3/1998 | Lappington |
| 5,739,808 A | 4/1998 | Suga et al. |
| 5,740,326 A | 4/1998 | Boulet |
| 5,748,716 A | 5/1998 | Levine |
| 5,758,257 A | 5/1998 | Herz |
| 5,760,820 A | 6/1998 | Eda |
| 5,761,601 A | 6/1998 | Nemirofsky |
| 5,761,606 A | 6/1998 | Wolzien |
| 5,769,269 A * | 6/1998 | Peters ................ 221/7 |
| 5,781,734 A | 7/1998 | Ohno |
| 5,790,202 A | 8/1998 | Kummer |
| 5,790,937 A | 8/1998 | Gutle |
| 5,793,343 A | 8/1998 | Hart |
| 5,799,285 A | 8/1998 | Klingman |
| 5,805,154 A | 9/1998 | Brown |
| 5,805,763 A | 9/1998 | Lawler |
| 5,809,139 A | 9/1998 | Girod |
| 5,818,806 A | 10/1998 | Wong |
| 5,822,432 A | 10/1998 | Moskowitz |
| 5,825,407 A | 10/1998 | Cowe |
| 5,826,123 A | 10/1998 | Lai |
| RE35,954 E | 11/1998 | Levine |
| 5,832,287 A | 11/1998 | Atalla |
| 5,835,896 A | 11/1998 | Fisher |
| 5,841,979 A | 11/1998 | Schulhof |
| 5,845,083 A | 12/1998 | Hamadani |
| 5,848,129 A | 12/1998 | Baker |
| 5,848,155 A | 12/1998 | Cox |
| 5,848,352 A | 12/1998 | Dougherty |
| 5,852,812 A | 12/1998 | Reeder |
| 5,854,779 A | 12/1998 | Johnson |
| 5,860,068 A | 1/1999 | Cook |
| 5,868,954 A | 2/1999 | Yoshino et al. |
| 5,870,717 A | 2/1999 | Wiecha |
| 5,874,985 A | 2/1999 | Matthews, III |
| 5,889,868 A | 3/1999 | Moskowitz |
| 5,890,136 A | 3/1999 | Kipp |
| 5,897,622 A | 4/1999 | Blinn |
| 5,898,384 A | 4/1999 | Alt |
| 5,899,980 A | 5/1999 | Wilf |
| 5,903,878 A | 5/1999 | Talati |
| 5,905,800 A | 5/1999 | Moskowitz |
| 5,909,492 A | 6/1999 | Payne |
| 5,913,039 A * | 6/1999 | Nakamura et al. ........ 709/231 |
| 5,915,027 A | 6/1999 | Cox |
| 5,915,068 A | 6/1999 | Levine |

| | | | | | | |
|---|---|---|---|---|---|---|
| 5,918,213 A | 6/1999 | Bernard | 6,249,332 B1 | 6/2001 | Bryan-Brown | |
| 5,930,026 A | 7/1999 | Jacobson | 6,252,522 B1 | 6/2001 | Hampton | |
| 5,930,369 A | 7/1999 | Cox | 6,253,189 B1 | 6/2001 | Feezell | |
| 5,933,798 A | 8/1999 | Linnartz | 6,266,442 B1 | 7/2001 | Laumeyer et al. | |
| 5,934,795 A | 8/1999 | Rykowski | 6,285,984 B1 | 9/2001 | Speicher | |
| 5,937,392 A | 8/1999 | Alberts | 6,294,284 B1 | 9/2001 | Lynch | |
| 5,940,135 A | 8/1999 | Petrovic | 6,356,794 B1 * | 3/2002 | Perin et al. | 700/78 |
| 5,940,807 A | 8/1999 | Purcell | 6,396,205 B1 | 5/2002 | Sprague | |
| 5,943,670 A | 8/1999 | Prager | 6,408,278 B1 | 6/2002 | Carney | |
| 5,946,665 A | 8/1999 | Suzuki | 6,424,845 B1 | 7/2002 | Emmoft | |
| 5,949,885 A | 9/1999 | Leighton | 6,424,998 B1 | 7/2002 | Hunter | |
| 5,955,710 A | 9/1999 | DiFranza | 6,429,812 B1 | 8/2002 | Hoffberg | |
| 5,959,945 A | 9/1999 | Kleiman | 6,430,603 B1 | 8/2002 | Hunter | |
| 5,960,081 A | 9/1999 | Vynne | 6,430,605 B1 | 8/2002 | Hunter | |
| 5,960,411 A | 9/1999 | Hartman | 6,434,479 B1 | 8/2002 | Kondou et al. | |
| 5,961,804 A | 10/1999 | Jacobson | 6,442,529 B1 | 8/2002 | Krishan | |
| 5,963,264 A | 10/1999 | Jackson | 6,446,045 B1 | 9/2002 | Stone | |
| 5,963,915 A | 10/1999 | Kirsch | 6,473,072 B1 | 10/2002 | Comiskey | |
| 5,963,917 A | 10/1999 | Ogram | 6,538,801 B1 | 3/2003 | Jacobson et al. | |
| 5,966,440 A | 10/1999 | Hair | 6,539,417 B1 | 3/2003 | Stern | |
| 5,966,696 A | 10/1999 | Giraud | 6,553,404 B1 | 4/2003 | Stern | |
| 5,966,697 A | 10/1999 | Fergerson | 6,560,649 B1 | 5/2003 | Mullen | |
| 5,969,283 A | 10/1999 | Looney | 6,571,279 B1 | 5/2003 | Herz | |
| 5,969,715 A | 10/1999 | Dougherty | 6,573,880 B1 * | 6/2003 | Simoni et al. | 345/87 |
| 5,970,471 A | 10/1999 | Hill | 6,591,247 B1 | 7/2003 | Stern | |
| 5,970,472 A | 10/1999 | Allsop | 6,622,142 B1 | 9/2003 | Murray et al. | |
| 5,970,473 A | 10/1999 | Gerszberg | 6,639,608 B1 | 10/2003 | Itakura | |
| 5,970,474 A | 10/1999 | Leroy | 6,654,757 B1 | 11/2003 | Stern | |
| 5,970,475 A | 10/1999 | Barnes | 6,701,143 B1 | 3/2004 | Dukach | |
| 5,974,396 A | 10/1999 | Anderson | 6,753,830 B1 * | 6/2004 | Gelbman | 345/55 |
| 5,978,775 A | 11/1999 | Chen | 6,754,636 B1 | 6/2004 | Walker et al. | |
| 5,983,199 A | 11/1999 | Kaneko | 6,760,916 B1 * | 7/2004 | Holtz et al. | 725/34 |
| 5,983,200 A | 11/1999 | Slotznick | 6,864,875 B1 | 3/2005 | Drzaic et al. | |
| 5,983,201 A | 11/1999 | Fay | 2001/0002852 A1 | 6/2001 | Kwoh | |
| 5,988,078 A | 11/1999 | Levine | 2001/0003846 A1 | 6/2001 | Rowe | |
| 5,991,737 A | 11/1999 | Chen | 2001/0005906 A1 | 6/2001 | Humpleman | |
| 5,992,888 A | 11/1999 | North | 2001/0010045 A1 | 7/2001 | Stefik | |
| 6,002,772 A | 12/1999 | Saito | 2001/0010095 A1 | 7/2001 | Ellis | |
| 6,013,007 A | 1/2000 | Root | 2001/0013037 A1 | 8/2001 | Matsumoto | |
| 6,014,247 A | 1/2000 | Winter | 2001/0013120 A1 | 8/2001 | Tsukamoto | |
| 6,014,491 A | 1/2000 | Hair | 2001/0014882 A1 | 8/2001 | Stefik | |
| 6,025,868 A | 2/2000 | Russo | 2001/0016836 A1 | 8/2001 | Boccon | |
| 6,026,375 A | 2/2000 | Hall | 2001/0017920 A1 | 8/2001 | Son | |
| 6,029,141 A | 2/2000 | Bezos | 2001/0018742 A1 | 8/2001 | Hirai | |
| 6,052,554 A | 4/2000 | Hendricks | 2001/0018858 A1 | 9/2001 | Dwek | |
| 6,058,417 A | 5/2000 | Hess | 2001/0023416 A1 | 9/2001 | Hosokawa | |
| 6,060,993 A | 5/2000 | Cohen | 2001/0023417 A1 | 9/2001 | Stefik | |
| 6,065,969 A | 5/2000 | Rifkin | 2001/0023428 A1 | 9/2001 | Miyazaki | |
| 6,067,107 A | 5/2000 | Travaille | 2001/0024425 A1 | 9/2001 | Tsunoda | |
| 6,067,185 A | 5/2000 | Albert | 2001/0024566 A1 | 9/2001 | Mankowitz | |
| 6,067,532 A | 5/2000 | Gebb | 2001/0025259 A1 | 9/2001 | Rouchon | |
| 6,073,372 A | 6/2000 | Davis | 2001/0025269 A1 | 9/2001 | Otsuka | |
| 6,091,883 A | 7/2000 | Artigalas | 2001/0025316 A1 | 9/2001 | Oh | |
| 6,115,348 A | 9/2000 | Guerra | 2001/0027561 A1 | 10/2001 | White | |
| 6,120,588 A | 9/2000 | Jacobson | 2001/0027563 A1 | 10/2001 | White | |
| 6,124,851 A | 9/2000 | Jacobson | 2001/0029491 A1 | 10/2001 | Yonetta | |
| 6,130,773 A | 10/2000 | Jacobson | 2001/0029538 A1 | 10/2001 | Blockton | |
| 6,141,530 A | 10/2000 | Rabowsky | 2001/0029583 A1 | 10/2001 | Palatov | |
| 6,148,142 A | 11/2000 | Anderson | 2001/0030660 A1 | 10/2001 | Zainouiline | |
| 6,148,428 A | 11/2000 | Welch | 2001/0031066 A1 | 10/2001 | Meyer | |
| 6,150,964 A | 11/2000 | McLaughlin | 2001/0032131 A1 | 10/2001 | Mowry | |
| 6,154,220 A | 11/2000 | Prakriya et al. | 2001/0032132 A1 | 10/2001 | Moran | |
| 6,157,396 A | 12/2000 | Margulis et al. | 2001/0032133 A1 | 10/2001 | Moran | |
| 6,167,358 A * | 12/2000 | Othmer et al. ... 702/188 | 2001/0032187 A1 | 10/2001 | Nuttall | |
| 6,172,798 B1 | 1/2001 | Albert et al. | 2001/0032312 A1 | 10/2001 | Runje | |
| 6,177,921 B1 | 1/2001 | Comiskey | 2001/0034635 A1 | 10/2001 | Winters | |
| 6,215,411 B1 | 4/2001 | Gothard | 2001/0034714 A1 | 10/2001 | Terao | |
| 6,221,267 B1 | 4/2001 | Ikeda | 2001/0034883 A1 | 10/2001 | Zigmond | |
| 6,223,027 B1 | 4/2001 | Ono | 2002/0055880 A1 | 5/2002 | Unold | |
| 6,232,950 B1 | 5/2001 | Albert | 2002/0087335 A1 | 7/2002 | Meyers et al. | |
| 6,233,389 B1 | 5/2001 | Barton | 2002/0091738 A1 | 7/2002 | Rohrabaugh | |
| 6,233,682 B1 | 5/2001 | Fritsch | 2002/0097193 A1 | 7/2002 | Powers | |
| 6,240,401 B1 | 5/2001 | Oren | 2002/0099533 A1 | 7/2002 | Jaqua | |

| | | |
|---|---|---|
| 2002/0165776 A1 | 11/2002 | Hunter |
| 2003/0001796 A1 | 1/2003 | Wampler et al. |
| 2003/0001830 A1 | 1/2003 | Wampler et al. |
| 2003/0004805 A1 | 1/2003 | Vaitekunas et al. |
| 2003/0004806 A1 | 1/2003 | Vaitekunas |
| 2003/0061353 A1 | 3/2003 | Johnson et al. |
| 2004/0036622 A1 | 2/2004 | Dukach et al. |

FOREIGN PATENT DOCUMENTS

| | | |
|---|---|---|
| CA | 2189454 | 11/1995 |
| CA | 2231376 | 3/1997 |
| EP | 0683943 B1 | 11/1993 |
| EP | 0954176 A2 | 11/1999 |
| EP | 0954179 A2 | 11/1999 |
| EP | 0975111 A2 | 1/2000 |
| EP | 0977389 A2 | 2/2000 |
| EP | 0984631 A1 | 3/2000 |
| EP | 0994470 A2 | 4/2000 |
| EP | 1104195 A2 | 5/2001 |
| EP | 1143721 A1 | 10/2001 |
| EP | 1244303 A2 | 9/2002 |
| WO | WO 91/03112 | 3/1991 |
| WO | WO 95/12282 | 5/1995 |
| WO | WO 96/34467 | 10/1996 |
| WO | WO 96/34494 | 10/1996 |
| WO | WO 96/26605 | 11/1996 |
| WO | WO 99/18727 | 4/1999 |
| WO | WO 99/35809 | 7/1999 |
| WO | WO 99/50775 | 10/1999 |
| WO | WO 00/07368 | 2/2000 |
| WO | WO 00/52934 | 9/2000 |
| WO | WO/00/52935 | 9/2000 |
| WO | WO/00/65576 | 11/2000 |
| WO | WO 01/41013 | 6/2001 |
| WO | WO 01/47249 | 6/2001 |

OTHER PUBLICATIONS

International Search Report, dated Oct. 18, 2004 for PCT Application No. PCT/US04/011186.

Written Opinion, dated Oct. 18, 2004 for PCT Application No. PCT/US04/011186.

Observations, dated Jun. 2, 2003, filed against European Patent Application No. 00928351.6.

(author unknown); "Scheduling InfoChannel Events," "Using ScalaNet," and "Additional InfoChannel EXes"; pp. 6-76; dated Jul. 23, 1996; (publisher unknown); (country of publication unknown).

Carol Hildebrand; "Movie Technology Puts an End to Bad Endings"; from *Computerworld*; (undated); (publisher unknown); (country of publication unknown).

James Daly; "Quiet on the Set! Lights, Camera, Digitize"; from *Computerworld*; (undated); (publisher unknown); (country of publication unknown).

Zimmerman et al.; "Bergens Tidene: A Small Revolution"; dated Jul. 24, 1998; (publisher unknown); (country of publication unknown).

(author unknown); "Digital Programe Delivery: Digital Cinema"; dated Oct. 18, 2002; (publisher unknown); (country of publication unknown).

Jim Mendrala; "A Brief History of Film and Cinema"; dated Jul. 1, 2002; (publisher unknown); (country of publication unknown).

Dean Takahashi; "Pac Bell Plans New Way to Get Films Into Theaters"; from *The Los Angeles Times*; dated Apr. 28, 1992; Los Angeles Times; U.S.

(author unknown); "E Cinema—Main Report"; (undated); (publisher unknown); (country of publication unknown).

Kjetil JØrgensen; "Dagens Næringsliv: CAPA Enters New Advertising Channel"; dated Aug. 5, 1998; (publisher unknown); (country of publication unknown).

David Griffiths; "Regarding: Update on Offer from Christie Digital Systems Inc."; dated Dec. 15, 1999; Christie Digital Systems Inc.; United Kingdom.

Patrick Von Sychowski; "Screen Digest's E-Cinema Alert #85"; dated Oct. 4, 2002; Screen Digest; (country of publication unknown).

Patrick Von Sychowski, "Screen Digest's E-Cinema Alert #86"; dated Oct. 14, 2002; Screen Digest; (country of publication unknown).

(author unknown); "Kontrakt"; dated Feb. 11, 1998; (publisher unknown); (country of publication unknown).

(author unknown); "Kintrakt"; dated Mar. 17, 1999; (publisher unknown); (country of publication unknown).

Steven A. Morley; "Making Digital Cinema Actually Happen—What It Takes and Who's Going to Do It"; dated Oct. 31, 1998; Qualcomm Incorporated; U.S.

David J. Fox; "Pacific Bell Unveils a New Way of Looking at Movies Technology: A High-Definition Digital Porjection Sent Over Fiber-Optic Telephone Lines Would Eliminate Film"; from *The Los Angeles Times*; dated Nov. 2, 1993; Los Angeles Times; U.S.

Office Action dated Sep. 8, 2004 for U.S. Appl. No. 10/175,057, filed Jun. 19, 2002.

Office Action dated Apr. 10, 2001 for U.S. Appl. No. 09/416,333, filed Oct. 12, 1999.

Office Action dated Jul. 18, 2000 for U.S. Appl. No. 09/416,333, filed Oct. 12, 1999.

Office Action dated Jul. 18, 2000 for U.S. Appl. No. 09/315,111, filed May 18, 1999.

Office Action dated Apr. 10, 2001 for U.S. Appl. No. 09/315,111, filed May 18, 1999.

Office Action dated Jul. 18, 2000 for U.S. Appl. No. 09/301,102, filed Apr. 28, 1999.

Office Action dated Apr. 10, 2001 for U.S. Appl. No. 09/301,102, filed Apr. 28, 1999.

Office Action dated Mar. 17, 2003 for U.S. Appl. No. 09/465,730, filed May 17, 2000.

Office Action dated Apr. 27, 2004 for U.S. Appl. No. 09/465,730, filed May 17, 2000.

English translation of Office Action dated Feb. 1, 2005 for JP Application No. 2000-614441, filed Oct. 29, 2001.

Office Action dated Apr. 9, 2004 for U.S. Appl. No. 10/133,343, filed Apr. 29, 2002.

Office Action dated May 27, 2004 for U.S. Appl. No. 10/133,733, filed Apr. 29, 2002.

Office Action dated May 19, 2005 for Israeli Application No. 146,160, filed Oct. 25, 2001 (with partial English translation).

Office Action dated Jun. 1, 2004 for Canadian Application No. 2,371,293, filed Apr. 24, 2000.

Office Action dated Feb. 23, 2005 for Canadian Application No. 2,371,293, filed Apr. 24, 2000.

Office Action dated Oct. 6, 2003 for U.S. Appl. No. 10/133,343, filed Apr. 29, 2002.

Office Action dated Jan. 7, 2005 for U.S. Appl. No. 10/133,343, filed Apr. 29, 2002.

Office Action dated Jan. 11, 2005 for U.S. Appl. No. 10/174,972, filed Jun. 19, 2002.

Office Action dated Mar. 26, 2004 for U.S. Appl. No. 10/174,972, filed Jun. 19, 2002.

Office Action dated Feb. 23, 2005 for U.S. Appl. No. 10/174,231, filed Jun. 19, 2002.

Office Action dated Mar. 26, 2004 for U.S. Appl. No. 10/174,231, filed Jun. 19, 2002.
Office Action dated Sep. 27, 2004 for U.S. Appl. No. 10/444,079, filed May 23, 2003.
Office Action dated Aug. 19, 2003 for U.S. Appl. No. 10/133,733, filed Apr. 29, 2002.
Office Action dated Jan. 21, 2005 for U.S. Appl. No. 10/133,733, filed Apr. 29, 2002.
Gyricon, Maestroware web page and FAQ sheet, printed Feb. 22, 2002 from www.gyriconmedia.com.
Gregory P. Crawford; "A Bright New Page in Portable Displays"; IEEE Spectrum; pp. 40-46; Oct. 2000, USA.
Office Action dated Aug. 9, 2005 for U.S. Appl. No. 10/174,231, filed Jun. 19, 2002.
Office Action dated Jul. 26, 2005 for U.S. Appl. No. 10/422,331, filed Apr. 24, 2003.
Office Action dated Jul. 7, 2005 for U.S. Appl. No. 10/175,057, filed Jun. 19, 2002.
Office Action dated Feb. 28, 2005 for U.S. Appl. No. 09/465,730, filed May 17, 2000.
Karen J. Bannan; "How It Works; Streaming Onto the Movie Screen, With Nary a Scratch"; The New York Times; p. E5; May 9, 2002.
Office Action dated Sep. 9, 2005 for U.S. Appl. No. 10/133,733, filed Apr. 29, 2002.
From http://www.archives.net, a history of Internet operation of eBay.com and amazon.com.
From http://www.amazon.com, amazon.com, Inc. practices of merchandising products & contacts between sellers and buyers.
From http://www.eBay.com, eBay.com practices of merchandising products & contacts between sellers and buyers.
"Universal Product Code (UPC) and EAN Article Numbering Code (EAN) Page," http://www.adams1.com/pub/russadam/upccode.html, by Russ Adams.
"DataPlay, Inc.—Universal Recording Media—Discover," http://www.dataplay.com/jsp_files/en/discover/index-music.jsp, downloaded and printed on May 14, 2002, (Copyright 2001).
"DataPlay, Inc.—Universal Recording Media—What's Playing on DataPlay," http://www.dataplay.com/servlets/ProductList?action=productSearch, downloaded and printed on May 14, 2002, (Copyright 2001).
"DataPlay, Inc.—Universal Recording Media—What's Playing on DataPlay," http://www.dataplay.com/jsp_files/en/whatsplaying/products.jsp, downloaded and printed on May 14, 2002, (Copyright 2001).
"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).
"DataPlay, Inc.—Universal Recording Media—Industry," http://www.dataplay.com/jsp_files/en/industry/products-digitalmedia.jsp, downloaded and printed on May 14, 2002, (Copyright 2001).
"DataPlay, Inc.—Universal Recording Media—Industry," http://www.dataplay.com/jsp_files/en/industry/products-engines.jsp, downloaded and printed on May 14, 2002, (Copyright 2001).
"DataPlay, Inc.—Universal Recording Media—Industry," http://www.dataplay.com/jsp_files/en/industry/contentproviders.jsp, downloaded and printed May 14, 2002, (Copyright 2001).
"DataPlay, Inc.—Universal Recording Media—Industry," http://www.dataplay.com/jsp_files/en/industry/products-contentkey.jsp, downloaded and printed on May 14, 2002, (Copyright 2001).
"DataPlay, Inc.—Universal Recording Media—Industry," http://www.dataplay.com/jsp_files/en/industry/index.jsp, downloaded and printed on May 14, 2002, (Copyright 2001).
"What's Playing on DataPlay—Everything Digital," DataPlay Micro-optical Engine Product Brochure, downloaded and printed on May 14, 2002, (Copyright 2001).
"What's Playing on DataPlay—Everything Digital," DataPlay Digital Media Product Brochure, downloaded and printed on May 14, 2002, (Copyright 2000-2001).
"Calimetrics' Multilevel Technology Enables Higher-Performance CD/DVD Recorders: An IDC White Paper," Wolfgang Schlichting, (Copyright 2000).
"Wink Television Press Room," http://www.wink.com/contents/PressReleases.shtml, downloaded and printed on May 14, 2002.
"Wink Annouces First National Advertising Partners: AT&T, Levi Strauss & Co., and GE," http://www.wink.com/contents/PressReleases/930708938.shtml, downloaded and printed on May 14, 2002, dated Sep. 9, 1998.
"Wink Communications, Inc. Changes the Advertising Landscape," http://www.wink.com/contents/PressReleases/930709807/shtml, downloaded and printed on May 14, 2002, dated Jan. 21, 1999.
"Wink's History," http://www.wink.com/contents/history.shtml, downloaded and printed on May 14, 2002.
"How Wink Works," http://www.wink.com/contents/howitworks.shtml, downloaded and printed on May 14, 2002.
"What is Wink: Examples," http://www.wink.com/contents/examples.shtml, downloaded and printed on May 14, 2002.
"The Wink System," http://www.wink.com/contents/tech_diagram.shtml, downloaded and printed on May 14, 2002.
"Wink Response Server and Wink Response Network," http://www.wink.com/contents/tech_wrs.shtml, donwloaded and printed on May 14, 2002.
"ICAP and HTML (ATVEF)," http://www.wink.com/contents/tech_icap.shtml, downloaded and printed on May 14, 2002.
"Wink Studio and Wink Server Studio," http://www.wink.com/contents/tech_studio.shtml, downloaded and printed on May 14, 2002.
"Wink Broadcast Server," http://www.wink.com/contents/tech_wbs.shtml, downloaded and printed on May 14, 2002.
"Wink Client Software," http://www.wink.com/contents/tech_engine.shtml, downloaded and printed on May 14, 2002.
"Onsale Invoice," http://www.onsale.com/cgi-win/invoice.exe, dated Jan. 19, 1998, printed Jan. 20, 1998, (Copyright 1997).
Onsale Packing Sheet (Jason Deep Space Series 225 X 60 Astronomy Telescope), received Jul. 1999.
Egghead Packing Receipt (Franklin Rex Organizer), received Dec. 1999.
"Sell Goods to Egghead.com," http://www.egghead.com/ShowPage.dll?page=hd_aboutus_sellgoods_p, printed Sep. 29, 2001.
"Demographics Profile," http://www.egghead.com/ShowPage.dll?page=hd_aboutus_demo_p, printed Sep. 29, 2001.
"About us," http://www.egghead.com/ShowPage.dll?page=hd_about us _about us_p, printed Sep. 29, 2001.

"Privacy and Security Policy," http://www.egghead.com/ShowPage.dll?page=hd_policy_policyandprivacy_p, printed Sep. 29, 2001.

"Registration," http://www.egghead.com/ShowPage.dll?page=reg_page1_ceos&S=1, printed Sep. 26, 2001.

"New Credit Information," https://secure.fairmarket.com/secure/Cre...FM1001, printed Sep. 26, 2001.

"Quandrant 256MB, PC133 (PC-100 Compatible), 32×54, 7ns, 168-pin, SdRAM DIMM Module (N21)," wysiwyg://253/http://auctions.egghead.com...LotNo=65659811&BatchNo=0, printed Sep. 24, 2001.

"Aston Digital VisionGate 52 15.1'TFT-LCD, Pivot Screen USB Hub, w/Speakers," wysiwyg://253/http://auctions.egghead.com...LotNo=66044439, printed Sep. 26, 2001.

"Login/Logout," http://www.egghead.com/ShowPage/dll:page...44439, printed Sep. 29, 2001.

"Enter Your Bid," wysiwyg://218/http://auctions.egghead.com...5a99, printed Sep. 29, 2001.

"Enter Your Bid," https://auctions.egghead.com/scripts/...LotNo=66044439, printed Sep. 29, 2001.

"Confirm Your Bid," wysiwyg://220/http://auctions.egghead.com...ShipCountry=US, printed Sep. 29, 2001.

"Bid Receipt for Bid No. 5270411," wysiwyg://220/http://auctions.egghead.com...KioskListing=0, printed Sep. 29, 2001.

Office Action dated Oct. 4, 2005 for U.S. Appl. No. 10/174,972, filed Jun. 19, 2002.

Office Action dated Oct. 11, 2005 for U.S. Appl. No. 10/133,343, filed Apr. 29, 2002.

US 5,825,354, 10/1998, Ahmad (withdrawn)

* cited by examiner

DYNAMIC DEVICE AND METHOD FOR DISPENSING MACHINES

This application is a Continuation-In-Part of U.S. patent application Ser. No. 10/175,057 filed Jun. 19, 2002.

FIELD OF THE INVENTION

The present invention relates, in general, to dispensing machines and, more particularly, to dispensing machines capable of dynamic-content presentation and methods of using dynamic-content presentation on dispensing machines.

BACKGROUND OF THE INVENTION

Dispensing machines are used to display various messages typically consisting of a combination of text and graphics. Traditionally, the message has been provided by way of fixed sheets that are attached to a backing or molded into structural components. This traditional approach suffers from the inability to quickly change the displayed message, because it requires the use of a crew to change the message, or replace an entire machine for upgrading.

Electronic billboards are known that include the dot matrix type utilizing many individual bulbs or Light Emitting Diodes (LED's). Within stadiums, arenas and auditoriums there presently are electronic dot matrix display devices used for instant replays, advertising and customer information.

Loban et al. disclose a video billboard including a remote computer control with radio communications to the billboard display in U.S. Pat. No. 5,612,741 ('741). The '741 patent discloses that display information is communicated from a master computer to a receiver in the billboard housing which, in turn, controls the light valve display of the '741 invention. Commands may also be communicated via shared or dedicated landlines. The '741 billboard is capable of providing complex video graphics with high contrast ratios. It can provide message changes on command through landline, cellular phone, satellite relay or other wireless communication links. Within the commercial advertising billboard industry it will allow the use of computer video control to change graphics easily and quickly, as desired. Information displays, public service announcements or traffic conditions can be displayed in near real time from remote locations since images can be downloaded via the communication links and displayed at pre-programmed time slots, if desired.

Gofman et al. disclose a system and method for serving local and global media content in PCT publication WO 00/52935 ('52935). The '52935 publication discloses a system and method for combining broadcast media content with additional content at a local site according to at least one locally determined characteristic of the audience to which the combined content is served. The '52935 publication discloses a template containing information concerning the type of data objects to be displayed, their size and location on the display, as well as the timing of display and transitions to the display, such that the template describes how to process and display the data.

New display materials are being developed that have the potential to expand advertising display technology, such as, for example, GYRICON a trade name of Xerox Corporation, Palo Alto Research Center, Palo Alto Calif. These new materials have the potential to expand the capabilities of dispensing machines. Another new material for displays is E-INK, a trade name of E Ink Corporation 733 Concord Avenue, Cambridge, Mass. GYRICON technology is disclosed, for example, in U.S. Pat. No. 4,126,854. E-INK technology is disclosed, for example, in U.S. Pat. No. 6,120,588.

It would therefore be advantageous to provide an improved method of dispensing machine advertising that reduces the effort necessary to manage dynamic dispensing machine displays. It would further be advantageous to provide methods of controlling dispensing machines that include content-display units. It would also be advantageous to provide easily manageable dynamic-content displays on dispensing machines. It would further be advantageous to provide a system capable of time shared display output for dispensing machines from a hierarchical control structure.

SUMMARY OF THE INVENTION

A dynamic device and methods for dispensing machine displays are disclosed. A dispensing machine device in accordance with the present invention comprises a display controller adapted to receive and display dynamic-content. At least one content display unit is in communication with the display controller, wherein the content display unit visually displays the information from the dynamic-content. The dispensing machine display controller may also comprise a timing means, the display controller altering the visual display of the content display unit as a function of a signal from the timing means. The display controller may be adapted to receive, store, and display dynamic-content from a plurality of servers, wherein the display controller comprises a hierarchical control scheme, the hierarchical control scheme adapted to select dynamic-content from one server of the plurality of servers for display on the content display unit. The dispensing machine device may also comprise a plurality of display controllers in communication with a plurality of content display unit devices, each display controller from the plurality of display controllers having a type identifier, wherein each of the display controllers selects dynamic-content for display on its content display unit as a function of the type identifier.

A method for dispensing machine advertising in accordance with one embodiment of the present invention includes the following steps:

A) providing a dispensing machine, wherein the dispensing machine comprises:
  a display controller, wherein the display controller is adapted to receive, store, and display dynamic-content; and
  a content-display unit in communication with the display controller, wherein the content-display unit visually displays the information from the dynamic-content;

B) receiving information from a source; and

C) displaying the information on the content-display unit.

A method in accordance with the present invention may also include one or more of the steps of:

D) In step C, the displaying step may be divided into a plurality of time segments, allowing the step of: displaying a first information display during a first time segment and displaying a second information display during a second time segment.

E) segmenting a plurality of content-display units into a plurality of groups, each group from the plurality of groups identified with a characteristic;

F) selecting a group from the plurality of groups to display dynamic-content on the plurality of content-display units having the group characteristic.

A method for dispensing machine advertising in accordance with an alternate embodiment of the present invention may include some or all of the following steps:

A) providing a dispensing machine, wherein the dispensing machine comprises:
   at least one server;
   at least one display controller, wherein the display controller is adapted to receive, store, and display dynamic-content from the server; and
   at least one content display unit in communication with the display controller, wherein the content display unit visually displays the information from the dynamic-content;
B) receiving information from a source;
C) communicating the information as dynamic-content from the server to the display controller;
D) displaying the information on the content display unit. In step D, the displaying step may be divided into a plurality of time segments, allowing the step of: displaying a first information display during a first time segment and displaying a second information display during a second time segment.
E) segmenting a plurality of content display units into a plurality of groups, each group from the plurality of groups identified with a characteristic;
F) selecting a group from the plurality of groups to display dynamic-content on the plurality of content display units having the group characteristic.

In step A, a plurality of servers may be provided, and the method may further comprise:

G) selecting a hierarchy, the hierarchy defining a prioritization of the plurality of servers to at least one of the display controllers such that the display controller selects one server from the plurality of servers.

BRIEF DESCRIPTION OF THE DRAWINGS

The novel features of the invention are set forth with particularity in the appended claims. The invention itself, however, both as to organization and methods of operation, together with further objects and advantages thereof, may best be understood by reference to the following description, taken in conjunction with the accompanying drawings in which:

DETAILED DESCRIPTION OF THE INVENTION

The present invention relates, in general, to dispensing machines and, more particularly, to dispensing machines capable of dynamic-content presentation and methods of using dynamic-content presentation on dispensing machines.

Content-display units are herein defined to include any visual display or portion of display on a dispensing machine capable of displaying information from dynamic-content such as, for example, video billboards, GYRICON, E-Ink, computer monitors, and other forms of electronic paper. Content display units are divided into two types, active content-display units and passive content-display units. Active content-display units are displays that only display dynamic-content when they are actively being addressed or written on, such as, for example, computer monitors, movie-theater screens, and L.E.D. displays. Passive content-display units are displays that, when not being actively written to or addressed, retain a viewable image such as, for example, GYRICON and E-INK.

A suitable material for a passive content-display media would be, for example, SMARTPAPER (Trademark of Gyricon Inc. Palo Alto, Calif.) technology using an array of tiny (100 micron diameter or smaller) solid beads with one hemisphere of each bead one color (e.g. white) and the other a different color (e.g. black). These beads are embedded in a flexible plastic sheet in small cavities surrounded by a liquid. Each bead carries an electrical charge. When an external electric field is applied the bead rotates or gyrates. Adhesive forces between each bead and cavity wall require an electrical threshold be exceeded before it will rotate. This makes an image electrically "printed" onto the material stable and unchanging until "erased" by another transmission. Electrical signals can be applied to the SMARTPAPER sheets through fixed surface electrodes or a moving stylus. A networked programmable sign will run for up to 2 years on 3 AA batteries, with the power almost completely used by the communications and processing systems. SMARTPAPER itself requires just a capacitance or voltage (about 100 volts), not a power current. Unlike other types of electronic displays, SMARTPAPER has a wide viewing angle identical to traditional printed signs. This allows SMARTPAPER to be viewed like paper, from all angles and without added backlighting. Images can currently be displayed on SMARTPAPER with resolution over 100 dpi. Applying electrical fields to the display surface changes the image on SMARTPAPER. For purposes herein, GYRICON and SMARTPAPER are synonymous.

Dynamic-content is herein defined as information or data to be visually displayed that is updateable or changeable by electronic control such as, for example, pixel data for an image, analog beam modulation information for a cathode ray tube (CRT), streaming video, and ASCII or other codes.

Display-time is herein defined as the actual display of dynamic-content on a content-display unit.

Figure 1:
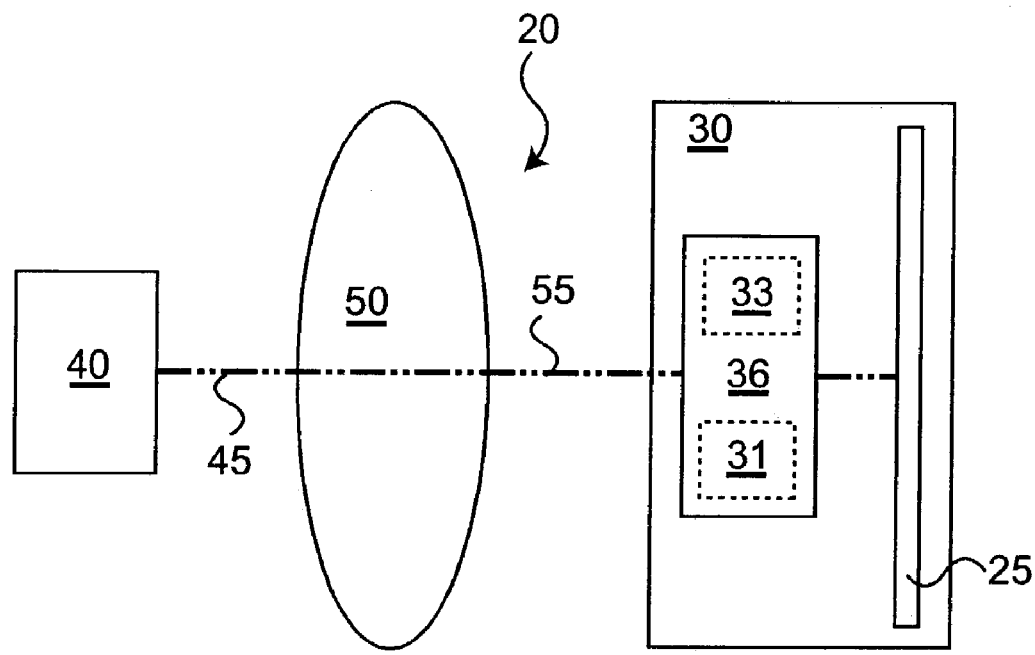
FIG. 1 is a block diagram of a dispensing machine system in accordance with the present invention.

FIG. 1 is a block diagram of a dispensing machine system 20 in accordance with the present invention. Dispensing machine system 20 comprises a server 40 and a display controller 30 adapted to receive, store, and display a dynamic-content from the server 40. Display controller 30 includes at least one content display unit 25, a receiver 36, storage means 33, and may include a timing means 31. Dynamic-content is transmitted from server 40 on a transmission path 45, through transmission media 50, and on receiving path 55 to display controller 30. Transmission path 45, transmission media 50, and receiving path 55 may be any one or combination of data transfer such as, for example, telephone wire, internet link, radio communication, cellular telephony, microwave link, local area network, and satellite broadcast. Receiver 36 receives the dynamic-content where it is either stored in storage means 33, or displayed on content display unit 25. Storage means 33 may be, for example, dynamic RAM in a computer, video tape, display memory, and computer hard disk.

The content display unit 25 visually displays the information from the dynamic-content. The timing means 31 may be, for example, a clock, a Global Positioning System (GPS), timing trigger, or other means of detecting a timing event. The display controller 30 alters the visual display of the content display unit 25 as a function of the time or position from the timing means 31. For example, if content display unit 25 is located near a restaurant visible to customers, it may be desirable to display a first message on content display unit 25 during lunch hours, and to display a second different message on content display unit 25 at other times.

Figure 2:
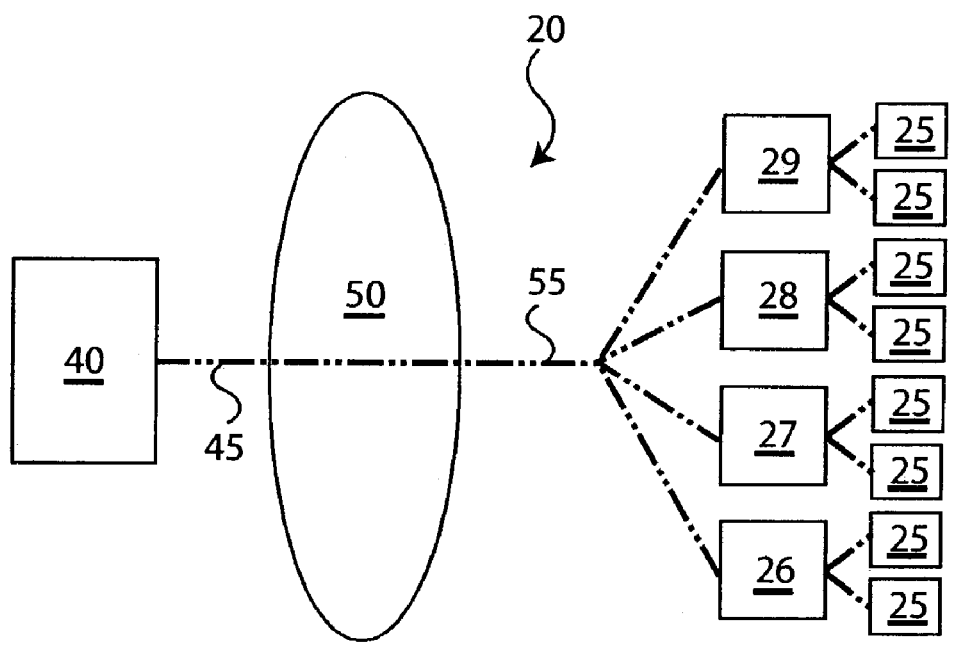
FIG. 2 is a block diagram of a dispensing machine system including a plurality of content-display units in accordance with the present invention.

FIG. 2 is a block diagram of dispensing machine system 20 including a plurality of content display units 25 in accordance with the present invention. The dispensing machine system 20 may also comprise a plurality of display controllers 26, 27, 28, 29 in communication with a plurality of content display units 25, each one from the plurality of display controllers 26, 27, 28, 29 having a type identifier, wherein each of the display controllers 26, 27, 28, 29 selects dynamic-content for display on its content display unit 25 as a function of its type identifier. For example, display controller 26 may have a type identifier of highway rest-area dispensing machine, display controller 27 may have a type identifier of shopping mall dispensing machine, display controller 28 may have a type identifier of the first machine in a series of dispensing machines, and display controller 29 may have a type identifier of a dispensing machine in Butler County in the state of Ohio in the United States of America.

Figure 3:
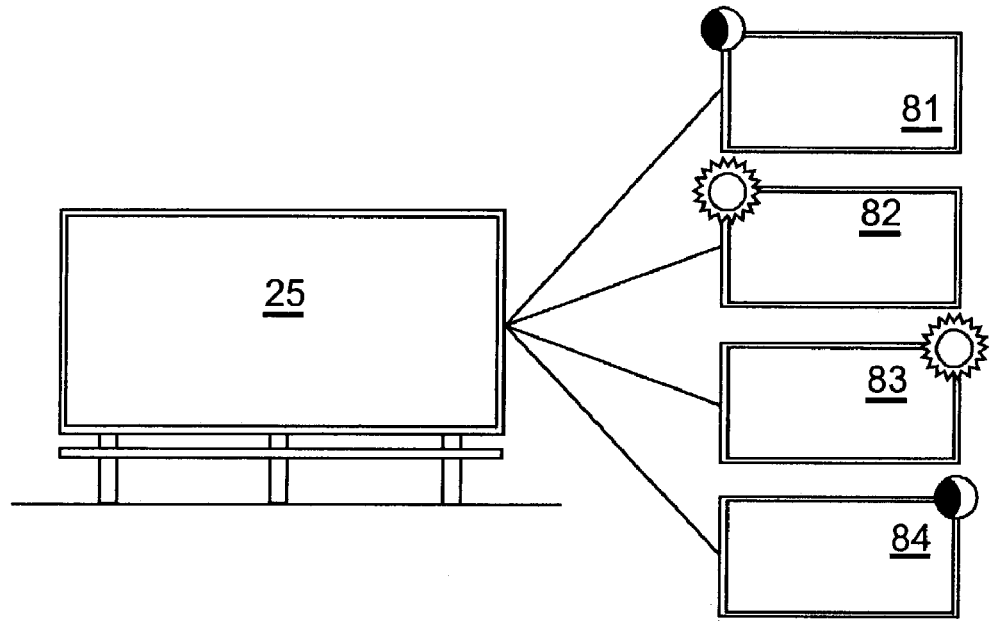
FIG. 3 is a block diagram of a dispensing machine device in accordance with the present invention.

FIG. 3 is a block diagram of a content display unit 25 in accordance with the present invention. Content display unit 25 may display dynamic-content that changes over time such as, for example, video, image morphing, sequential messages, or discrete time periods of static image. FIG. 3 illustrates an example of discrete time periods of static image. An image 81 may be displayed on content-display unit 25 during the overnight period of a day, an image 82 may be displayed on content-display unit 25 during the morning period of a day, an image 83 may be displayed on content-display unit 25 during the afternoon period of a day, and an image 84 may be displayed on content-display unit 25 during the evening period of a day.

Figure 4:
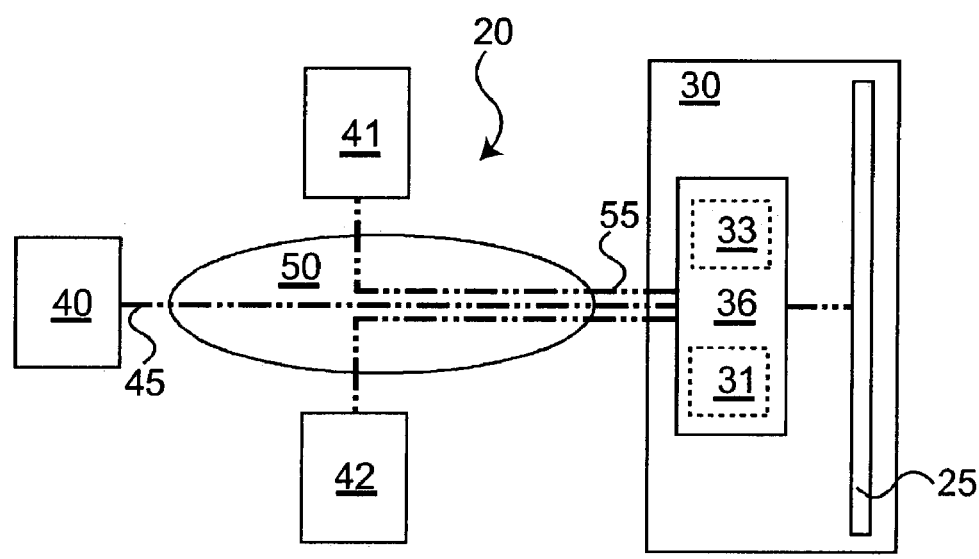
FIG. 4 is a block diagram of a dispensing machine system with a hierarchical control in accordance with the present invention.

FIG. 4 is a block diagram of a dispensing machine system 20 with a hierarchical control in accordance with the present invention. The display controller 30 may be adapted to receive, store, and display dynamic-content from a plurality of servers illustrated in FIG. 4 as server 40, a second server 41, and a third server 42. Display controller 30 comprises a hierarchical control scheme, the hierarchical control scheme adapted to select dynamic-content from one server of the plurality of servers for display on the content display unit 25. The hierarchical control scheme may be prioritized or heuristic. For example, server 40 may be a national host computer at a highest priority, second server 41 may be a regional host computer at a middle priority, and third server 42 may be a local host computer at a low priority. Since any or all servers may be transmitting dynamic-content at any time or simultaneously, the hierarchical control scheme will select which dynamic-content is displayed on content display unit 25 at any time.

Figure 5:
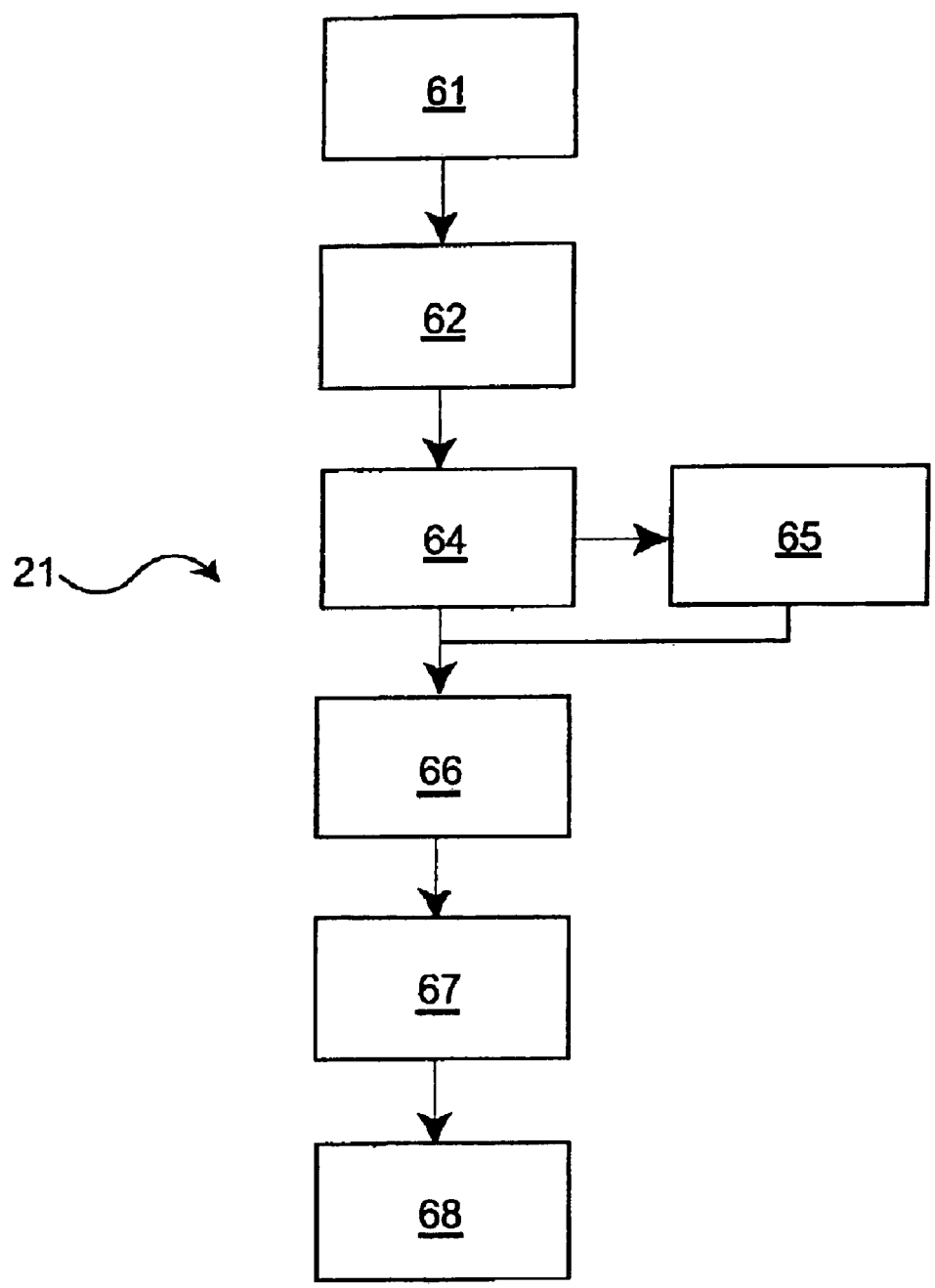
FIG. 5 is a flow chart illustrating a method of dispensing machine information display in accordance with the present invention.

FIG. 5 is a flow chart illustrating a method 21 of dispensing machine advertising in accordance with the present invention. The method 21 for dispensing machine advertising illustrated in FIG. 5 includes the following steps:

A) providing a dispensing machine, wherein the dispensing machine comprises:
at least one display controller, wherein the display controller is adapted to receive, store, and display dynamic-content; and
at least one content-display unit in communication with the display controller, wherein the content-display unit visually displays the information from the dynamic-content; (illustrated as step 61)

B) receiving information from a source; (illustrated as step 62)

C) displaying the information on the content-display unit. (illustrated as step 64)

In step C, the displaying step may be divided into a plurality of time segments, allowing the step of:

D) displaying a first information display during a first time segment and displaying a second information display during a second time segment. (illustrated as step 65)

E) segmenting a plurality of content-display units into a plurality of groups, each group from the plurality of groups identified with a characteristic; (illustrated as step 66)

F) selecting a group from the plurality of groups to display dynamic-content on the plurality of content-display units having the group characteristic. (illustrated as step 67)

Further, one or more servers may be provided, each in communication with one or more content-display units. A plurality of servers may be provided, and the method may further comprise:

G) selecting a hierarchy, the hierarchy defining a prioritization of the plurality of servers to at least one of the display controllers such that the display controller selects one server from the plurality of servers. (illustrated as step 68)

Illustrations of method steps, such as, for example, the steps illustrated in FIG. 5, show steps sequentially and in a particular order. There is no need to perform the steps in the order illustrated. Deviating from the illustrated order for some or all of the steps is contemplated by the inventor, and does not depart from the scope of the present invention.

Figure 6:
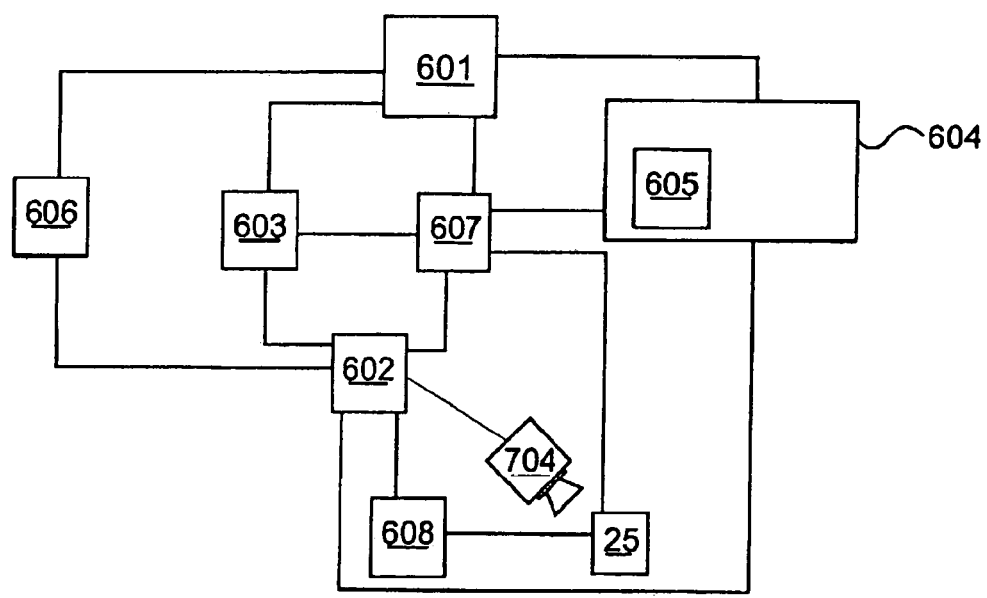
FIG. 6 illustrates a method in accordance with the present invention where a client selects content-display units for their information via the Internet.

FIG. 6 illustrates a method in accordance with the present invention where a client selects content-display units 25 for their information display via the Internet. An order 607 to display dynamic-content on one or more content-display units 25 is placed by a purchaser at a client system 601 and received by a server system 602. The server system 602 receives purchaser information including identification of the purchaser, payment information, and dynamic-content location information from the client system 601. The server system then assigns a client identifier 603 to the client system 601 and associates the assigned client identifier 603 with the received purchaser information. The server system 602 sends to the client system 601 the assigned client identifier 603 and an HTML document 604 identifying the content-display units 25 and including an order button 605. The client system 601 receives and stores the assigned client identifier 603 and receives and displays the HTML document 604. In response to the selection of the order button 605, the client system 601 sends to the server system 602 a request 606 to purchase display-time on the content-display units 25. The server system 602 receives the request 606 and combines the purchaser information associated with the client identifier 603 of the client system 601 to generate the order 607 to display the dynamic-content on the content-display units 25 in accordance with the billing information, whereby the purchaser orders the display-time by selection of the order button 605. Server system 602 sends dynamic content 608 to content-display unit 25 for display-time according to order 607. Content-display units 25 such as, for example, a roadside dispensing machine, may have a camera 704 accessible via the Internet for viewing the dispensing machine and its surroundings, to verify display-time or for service and quality control purposes.

Figure 7:
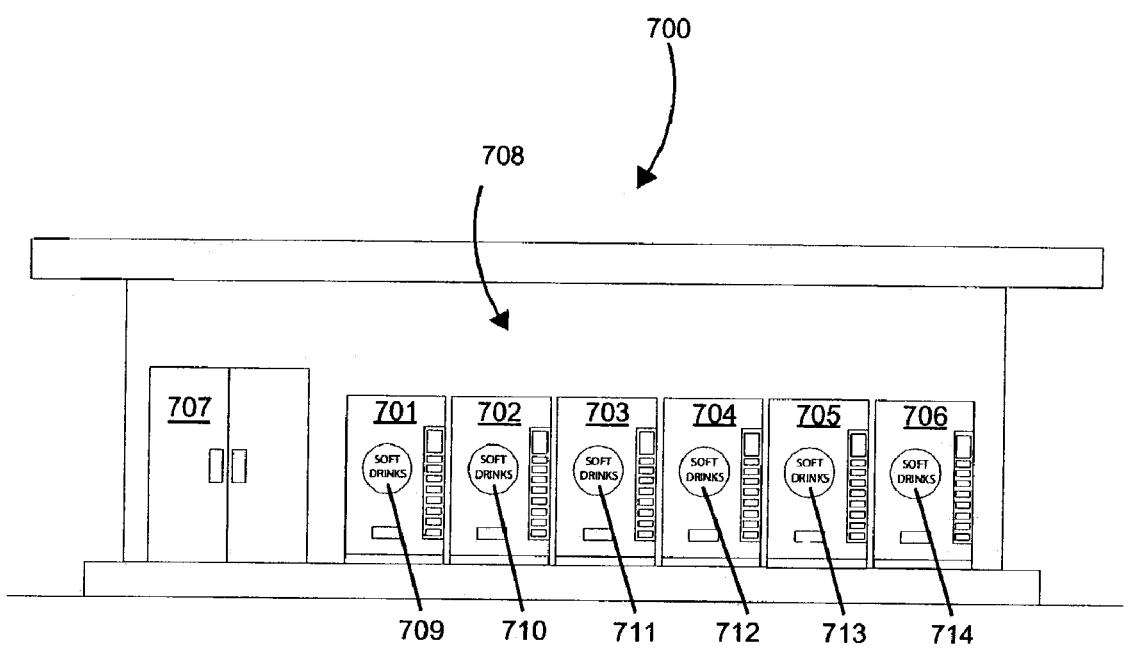
FIG. 7 illustrates a plurality of dispensing machines in accordance with the present invention.

FIG. 7 illustrates a plurality of dispensing machines 708 in accordance with the present invention. A storefront display 700 includes a first dispensing machine 701, a second dispensing machine 702, a third dispensing machine 703, a fourth dispensing machine 704, a fifth dispensing machine 705 and a sixth dispensing machine 706 positioned at a storefront 708 having a door 707. Each of dispensing machines 701 through 706 has a display 709 through 714 respectively.

First dispensing machine 701 may have a type identifier of first-machine-of-six, second dispensing machine may have a type identifier of second-machine-of-six, through sixth dispensing machine with a type identifier of sixth-machine-of-six. Dynamic content may be created to span all six displays, creating a larger-scale presentation for storefront 708. Alternately, dynamic content may span 2 or more dispensing machines, and may move across storefront 708 over time, traveling from display 709 to display 714 over time.

Figure 8:
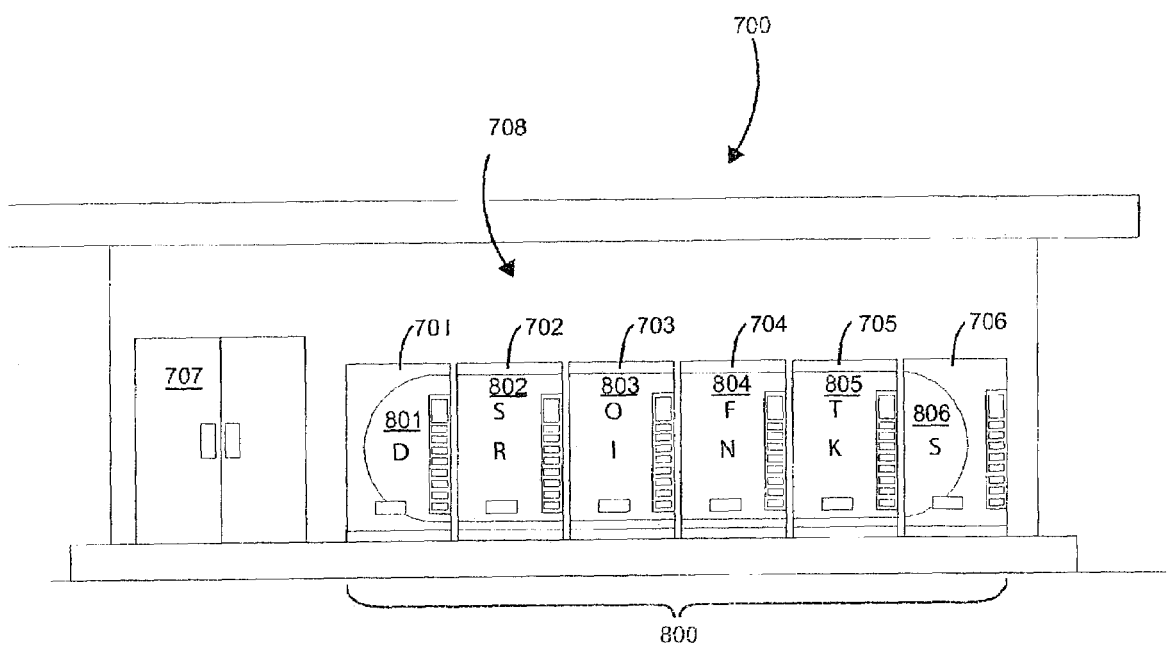
FIG. 8 illustrates a plurality of dispensing machines in accordance with an alternate embodiment of the present invention.

FIG. 8 illustrates a plurality of dispensing machines in accordance with an alternate embodiment of the present invention. First dispensing machine 701 through sixth dispensing machine 706 have a first image portion 801 through a sixth image portion 806 respectively, illustrating that a plurality of dispensing machines may perform as a single display or an advertising billboard 800. It is contemplated by the inventor that the dynamic content on the advertising billboard 800 may be totally unrelated to the contents of the dispensing machines, and may be used for emergency messages or other public service applications as well as commercial uses.

Figure 9:
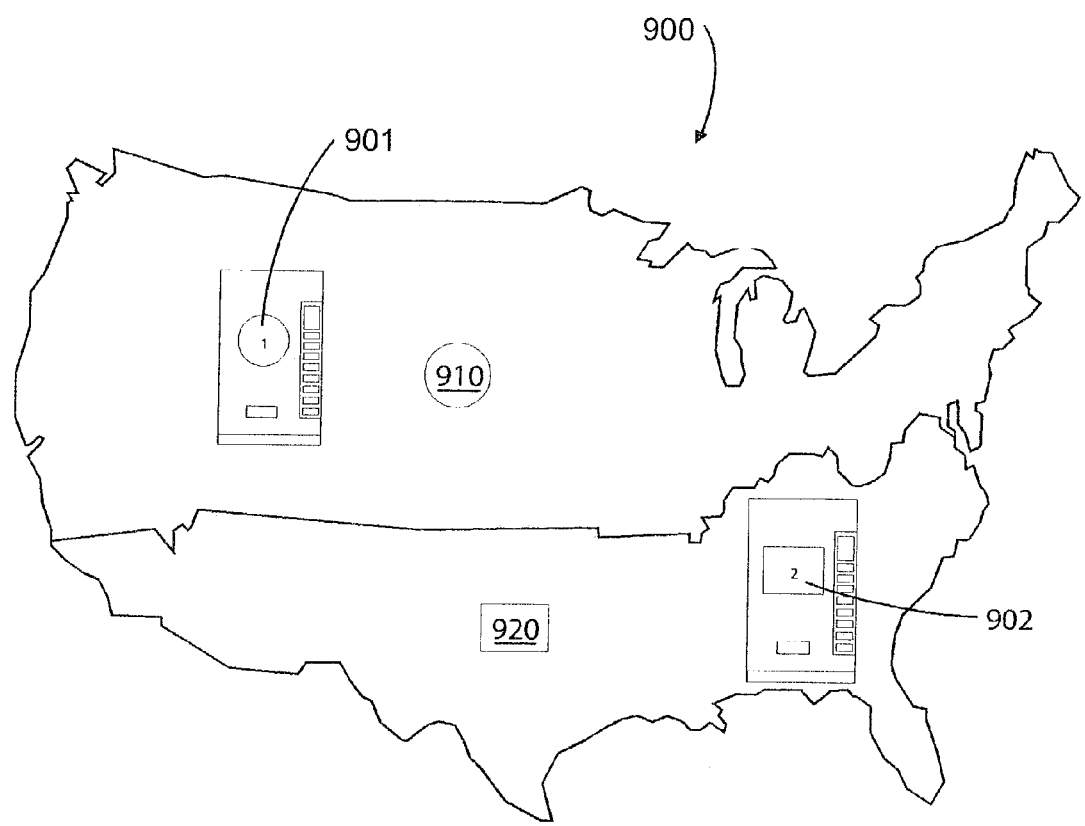
FIG. 9 illustrates a plurality of dispensing machines in accordance with another embodiment of the present invention.

FIG. 9 illustrates a plurality of dispensing machines in accordance with another embodiment of the present invention. A geographical area 900 is segmented into a first segment 910 and a second segment 920. Dispensing machines 901 in the first segment 910 may have a type identifier of first segment 910, as well as one or more other type identifier. Likewise, dispensing machines 902 in second segment 920 may have a type identifier of second segment 920, as well as one or more other type identifiers. Dispensing machines 901 may differ from dispensing machines 902 only by their geographical location type identifiers, and have all other type identifiers equal, and through a hierarchical control structure, alter their displays based on location.

Each feature disclosed in this specification (including any accompanying claims, abstract, and drawings), may be replaced by alternative features having the same, equivalent or similar purpose, unless expressly stated otherwise. Thus, unless expressly stated otherwise, each feature disclosed is one example only of a generic series of equivalent or similar features. In addition, it should be understood that every structure described above has a function and such structure can be referred to as a means for performing that function.

While preferred embodiments of the present invention have been shown and described herein, it will be obvious to those skilled in the art that such embodiments are provided by way of example only. Numerous variations, changes, and substitutions will be apparent to those skilled in the art without departing from the invention. Accordingly, it is intended that the invention be limited only by the spirit and scope of the appended claims.

What is claimed is:

1. A dispensing machine system comprising:
a plurality of servers;
a hierarchy associated with said plurality of servers, wherein said hierarchy defines a prioritization of said plurality of servers; and
a plurality of dispensing machines in communication with said plurality of servers, wherein each of the dispensing machines comprises:
i) one or more products, wherein each of the dispensing machines is operable to dispense its respective one or more products,
ii) a display controller, wherein said display controller is operable to select a server from said plurality of servers in accordance with said hierarchy, wherein said display controller is adapted to communicate dynamic-content from said selected server, and
iii) one or more passive content-display units in communication with said display controller, wherein said one or more passive content-display units visually displays the dynamic-content communicated from the display controller.

2. The dispensing machine system of claim 1, wherein said one or more passive content-display units comprises GYRICON.

3. The dispensing machine system of claim 1, wherein said one or more passive content-display units comprises E-INK.

4. The dispensing machine system of claim 1, wherein said display controller comprises a timing means, said display controller altering the visual display of said one or more passive content-display units as a function of the time from said timing means.

5. The dispensing machine system of claim 4, further comprising a plurality of display controllers in communication with a plurality of passive content-display units, each display controller from said plurality of display controllers having a type identifier, wherein each of said display controllers selects dynamic-content for display on its passive content-display unit as a function of said type identifier.

6. The dispensing machine system of claim 5, wherein one or more of said passive content-display units comprises GYRICON.

7. The dispensing machine system of claim 5, wherein one or more of said passive content-display units comprises E-INK.

8. The dispensing machine system of claim 4, wherein one or more of said passive content-display units comprises GYRICON.

9. The dispensing machine system of claim 4, wherein one or more of said passive content-display units comprises E-INK.

10. The dispensing machine system of claim 1, further comprising a plurality of display controllers in communication with a plurality of passive content-display units, each display controller from said plurality of display controllers having a type identifier, wherein each of said display controllers selects dynamic-content for display on its passive content-display unit as a function of said type identifier.

11. The dispensing machine system of claim 10, wherein one or more of said passive content-display units comprises GYRICON.

12. The dispensing machine system of claim 10, wherein one or more of said passive content-display units comprises E-INK.

13. The dispensing machine system of claim 1, wherein the hierarchy comprises a heuristic hierarchical control scheme.

14. A dispensing machine system comprising:
   a plurality of dispensing machines, wherein each dispensing machine of the plurality of dispensing machines comprises one or more products, wherein each dispensing machine of said plurality of dispensing machines is operable to dispense its respective one or more products;
   a plurality of display controllers, wherein each display controller of said plurality of display controllers is adapted to receive and display dynamic-content, wherein each dispensing machine of said plurality of dispensing machines comprises one or more display controllers of said plurality of display controllers;
   a plurality of passive content-display units in communication with said plurality of display controllers, wherein each passive content-display unit of said plurality of passive content-display units is in communication with a respective display controller of said plurality of display controllers, wherein each passive content-display unit of said plurality of passive content-display units is operable to visually display information from said dynamic-content, wherein each dispensing machine of said plurality of dispensing machines comprises one or more passive content-display units of said plurality of passive content-display units; and
   a plurality of type identifiers, wherein each passive content-display unit of said plurality of passive content-display units is associated with one or more type identifiers of said plurality of type identifiers;
   wherein each display controller of said plurality of display controllers is adapted to receive, store, and display dynamic-content from a plurality of sources, wherein one or more display controllers of said plurality of display controllers comprises a hierarchical control scheme, said hierarchical control scheme being adapted to select dynamic-content from one source of said plurality of sources for display on one or more of said passive content-display units.

15. The dispensing machine system of claim 14, wherein each of said display controllers selects dynamic-content for display on its passive content-display unit as a function of said type identifier.

16. The dispensing machine system of claim 15, wherein one or more of said passive content-display units comprises GYRICON.

17. The dispensing machine system of claim 16, wherein one or more display controllers of said plurality of display controllers comprises a timing means, said one or more display controllers of said plurality of display controllers altering the visual display of one or more passive content-display units of said plurality of passive content-display units as a function of the time from said timing means.

18. The dispensing machine system of claim 15, wherein one or more of said passive content-display units comprises E-INK.

19. The dispensing machine system of claim 18, wherein one or more display controllers of said plurality of display controllers comprises a timing means, said one or more display controllers of said plurality of display controllers altering the visual display of one or more passive content-display units of said plurality of passive content-display units as a function of the time from said timing means.

20. The dispensing machine system of claim 14, wherein each of said display controllers selects dynamic-content for display on its passive content-display unit as a function of said type identifier.

21. The dispensing machine system of claim 20, wherein one or more of said passive content-display units comprises GYRICON.

22. The dispensing machine system of claim 21, wherein one or more display controllers of said plurality of display controllers comprises a timing means, said one or more display controllers of said plurality of display controllers altering the visual display of one or more passive content-display units of said plurality of passive content-display units as a function of the time from said timing means.

23. The dispensing machine system of claim 20, wherein one or more of said passive content-display units comprises E-INK.

24. The dispensing machine system of claim 23, wherein one or more display controllers of said plurality of display controllers comprises a timing means, said one or more display controllers of said plurality of display controllers altering the visual display of one or more passive content-display units of said plurality of passive content-display units as a function of the time from said timing means.

25. The dispensing machine system of claim 14, wherein one or more of said passive content-display units comprises GYRICON.

26. The dispensing machine system of claim 25, wherein one or more display controllers of said plurality of display controllers comprises a timing means, said one or more display controllers of said plurality of display controllers altering the visual display of one or more passive content-display units of said plurality of passive content-display units as a function of the time from said timing means.

27. The dispensing machine system of claim 14, wherein one or more of said passive content-display units comprises E-INK.

28. The dispensing machine system of claim 27, wherein one or more display controllers of said plurality of display controllers comprises a timing means, said one or more display controllers of said plurality of display controllers altering the visual display of one or more passive content-display units of said plurality of passive content-display units as a function of the time from said timing means.

29. The dispensing machine system of claim 14, wherein the plurality of type identifiers include one or more of a highway rest-area dispensing machine, a shopping mall dispensing machine, a geographic location of a dispensing machine, and a particular dispensing machine of a series of proximate dispensing machines.

30. A method for dispensing machine advertising comprising the steps of:
   A) providing a plurality of dispensing machines, wherein each dispensing machine of the plurality of dispensing machines comprises:

i) one or more products, wherein each dispensing machine of the plurality of dispensing machines is operable to dispense its respective one or more products, and
  ii) a content-display unit;
B) associating each dispensing machine of said plurality of dispensing machines with one or more type identifiers;
C) providing a plurality of display controllers, wherein each display controller of said plurality of display controllers is adapted to provide dynamic-content for a respective content-display unit;
D) receiving dynamic-content from a source, wherein the source is remote relative to at least a portion of the plurality of dispensing machines;
E) displaying said dynamic-content on one or more of said content-display units in accordance with said one or more type identifiers; and
F) providing a plurality of servers; and
G) providing a hierarchy to one or more display controllers of said plurality of display controller, wherein said hierarchy is used to select one server from said plurality of servers for dynamic-content to display by said one or more display controllers.

31. The method of claim 30, further comprising the steps of:
  H) providing a clock indicating a time; and
  I) changing the dynamic-content displayed on one or more of said content-display units from a first dynamic-content to a second dynamic-content at a first time.

32. The method of claim 30, wherein one or more of said type identifiers correspond with the type of location at which the respective dispensing machine is located.

33. The method of claim 30, wherein one or more of said type identifiers corresponds with the unique geographic location at which the respective dispensing machine is located.

34. The method of claim 30, wherein in step E, information is displayed on each of said plurality of content-display units having a plurality of type identifiers.

35. The method of claim 30, further comprising:
  H) receiving an order to display dynamic-content from a purchaser at a client system;
  I) assigning a client identifier to the client system; and
  J) displaying dynamic-content in accordance with the order.

* * * * *

UNITED STATES PATENT AND TRADEMARK OFFICE
CERTIFICATE OF CORRECTION

| | | |
|---|---|---|
| PATENT NO. | : 7,088,352 B2 | Page 1 of 1 |
| APPLICATION NO. | : 10/412539 | |
| DATED | : August 8, 2006 | |
| INVENTOR(S) | : Scott Wampler | |

It is certified that error appears in the above-identified patent and that said Letters Patent is hereby corrected as shown below:

Column 11, Claim 30, line 21, "...said plurality of display controller...", please delete and replace with, --...said plurality of display controllers...--

Signed and Sealed this

Twenty-first Day of November, 2006

JON W. DUDAS
*Director of the United States Patent and Trademark Office*